T. BARNES.
FASTENER FOR CUSHION TIRES ON CLENCHER RIMS.
APPLICATION FILED MAY 22, 1918.

1,292,564.

Patented Jan. 28, 1919.

Inventor
Thomas Barnes,
by G. B. McBath
Attorney

UNITED STATES PATENT OFFICE.

THOMAS BARNES, OF DENVER, COLORADO, ASSIGNOR TO BARNES CUSHION TIRE CO., OF DENVER, COLORADO, A CORPORATION OF COLORADO.

FASTENER FOR CUSHION-TIRES ON CLENCHER-RIMS.

1,292,564.

Specification of Letters Patent. Patented Jan. 28, 1919.

Application filed May 22, 1918. Serial No. 235,954.

*To all whom it may concern:*

Be it known that I, THOMAS BARNES, a citizen of the United States, residing at Denver, in the county of Denver and State of Colorado, have invented certain new and useful Improvements in Fasteners for Cushion-Tires on Clencher-Rims, of which the following is a specification.

This invention relates to a fastener whereby a specially constructed cushion tire may be fastened to the ordinary Ford clencher rim. Rims of this type are not divided and the usual pneumatic tire is formed with shoes adapted to engage the rim flanges, locking under them. To form such shoes on a cushion tire would not only involve the use of an unnecessary amount of rubber, but would place at a point where not actually needed material that could be used to better advantage in the body and tread of the tire, but it would be difficult to apply such form of tire as it is not deflatable as is a pneumatic tire.

Furthermore my cushion tire is of a special composition, which forms the subject matter of a separate application filed June 17, 1918, Serial No. 240,399, and it is to make this particular tire adaptable for use with the usual Ford car that I have designed my particular fastener.

The invention also consists of the novel features of construction hereinafter described, pointed out in the claims, and shown in the accompanying drawings, in which:—

Figure 1:
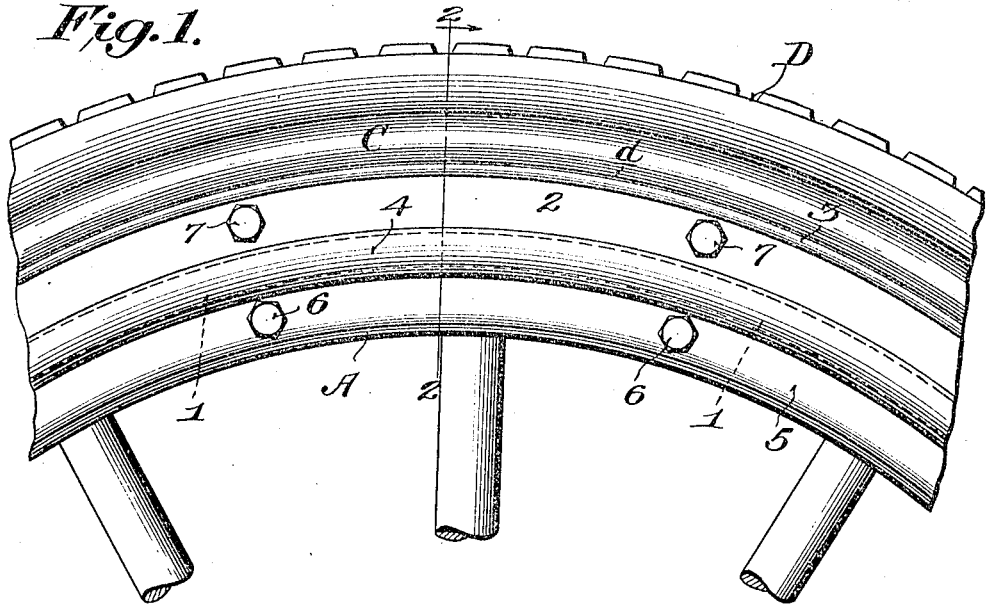
Figure 1 is a side elevation of a sector of my device and tire, applied to a clencher rim.
Figure 2:
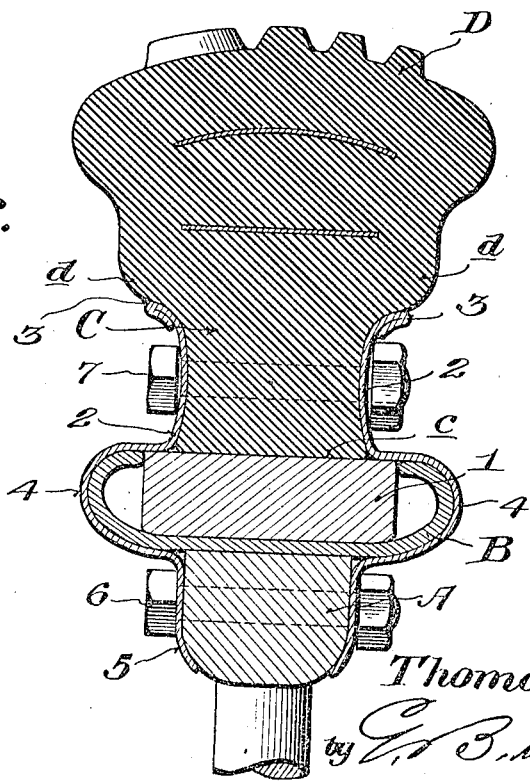
Fig. 2 is a section on the line 2—2 of Fig. 1.

In the drawings A designates the felly and B the clencher rim now in use on the type of cars mentioned.

These of course do not form a part of the invention.

C is the cushion tire which tire has a base section c substantially square in cross section, viz., it has a flat bottom or under face, approximately parallel outer faces, and the same thickness through. Carried by and integral with this base is a body and tread portion D, and shoulders d are formed on each side of the tire at the juncture of the body and base portions. As previously stated the composition and method of making this tire forms the subject matter of a separate application. The tire is shown and described only to illustrate the operation and utility of the fastening device.

Fitting snugly in the clencher rim B is a sectional wooden strip 1, the top of the strip or ring being flush with the upper faces of the rim flanges. This strip forms a support for the base c of the tire, and I preferably make it in four sections, though a larger or smaller number might be employed. After the tire has been placed on the sectional wooden ring 1 it is secured in place by metal rings or plates, which may also be in sections, and these plates 2 overlap the base c, the rim and the felly A. Along their outer edges the plates are bent or rolled over as at 3 forming a shoulder that engages the shoulders d of the tire. The central longitudinal portions of the plates bulge outwardly to envelop the rim B and the lower marginal edges of the plates are bent inwardly as at 5 to grip under the felly A.

The bulging portion 4 is shaped to conform to the cross section of the rim B and fits said rim snugly.

Bolts 6 secure the plates to the felly and bolts 7 pass through the plates and the tire base c.

By means of the above construction the tire can be easily, quickly and firmly secured to the ordinary non-sectional clencher rim.

What I claim is:—

1. The combination with a clencher rim and felly, of a sectional wooden ring inserted in the rim, a cushion tire having a base portion with approximately parallel side walls and shouldered at the juncture of the base and body portion, said tire resting on the wooden ring, and side plates bulged to envelop the clencher rim and overlapping the said base and felly and engaging the shoulders of the tire, and secured respectively to the said base and to the felly.

2. The combination with a clencher rim, its felly and a cushion tire having parallel shoulders thereon, of side plates overlapping the felly and tire, and rolled on their outer margins to form shoulders adapted to engage the shoulders of the tire, said plates being bulged in cross section to snugly fit the clencher rim, and bolts securing the plates respectively to the felly and to the said tire.

In testimony whereof I affix my signature.

THOMAS BARNES.

Copies of this patent may be obtained for five cents each, by addressing the "Commissioner of Patents, Washington, D. C."